United States Patent [19]

Clark

[11] Patent Number: 4,704,581
[45] Date of Patent: Nov. 3, 1987

[54] ELECTROMAGNETIC LOGGING APPARATUS USING VERTICAL MAGNETIC DIPOLE SLOT ANTENNAS

[75] Inventor: Brian Clark, Missouri City, Tex.

[73] Assignee: Schlumberger Technology Corp., New York, N.Y.

[21] Appl. No.: 876,944

[22] Filed: Jun. 20, 1986

Related U.S. Application Data

[63] Continuation-in-part of Ser. No. 687,071, Dec. 28, 1985.

[51] Int. Cl.⁴ .................. G01L 3/30; G01L 3/18; G01L 3/20; H01Q 13/10
[52] U.S. Cl. ............................ 324/341; 343/767
[58] Field of Search ............. 324/341; 343/767, 771

[56] References Cited

U.S. PATENT DOCUMENTS

| | | | |
|---|---|---|---|
| 2,264,318 | 12/1941 | Lee | 175/182 |
| 2,945,232 | 7/1960 | Jasik | 343/807 |
| 2,947,987 | 8/1960 | Dodington | 343/180 |
| 3,568,206 | 3/1971 | Sisson | 343/750 |
| 3,665,480 | 5/1972 | Fassett | 343/754 |
| 3,849,721 | 11/1974 | Calvert | 324/338 |
| 3,944,910 | 3/1976 | Rau | 324/338 |
| 4,511,842 | 4/1985 | Moran | 324/338 |
| 4,575,728 | 3/1986 | Theobald et al. | 343/813 |
| 4,578,645 | 3/1986 | Hoehn | 324/338 |
| 4,581,584 | 4/1986 | Baldwin | 324/338 |
| 4,590,480 | 5/1986 | Nikolayuk et al. | 343/771 |

FOREIGN PATENT DOCUMENTS 1040261 10/1978 Canada.
2146126 4/1985 United Kingdom.

OTHER PUBLICATIONS

Bethe "Theory Of Diffraction by Small Holes" The Physical Review, 1944.
Freedman et al. "Theory Of Microwave Dielectric Constant Logging Using The Electromagnetic Wave Propagation Method" Geophysics, 1979.
Stratton "Electromagnetic Theory" McGraw Hill, 1941, p. 437.

Primary Examiner—Reinhard J. Eisenzopf
Assistant Examiner—Walter E. Snow
Attorney, Agent, or Firm—Peter Lee; Keith Smith; Martin Novack

[57] ABSTRACT

An electromagnetic logging apparatus is disclosed which utilizes vertical magnetic dipole antennas for propagation logging, preferably at a frequency greater than 100 MHz. Slot antennas having conductive probes which are perpendicular to the borehole axis, and also perpendicular to a borehole radius, are employed to obtain the desired vertical magnetic dipole antenna characteristics. The depth of investigation is improved as compared to devices of this type which employ horizontal magnetic dipole antennas. Also, the antennas are tuned in a manner which provides advantageous operation.

29 Claims, 26 Drawing Figures

ELECTROMAGNETIC LOGGING APPARATUS USING VERTICAL MAGNETIC DIPOLE SLOT ANTENNAS

BACKGROUND OF THE INVENTION

This is a continuation-in-part of U.S. patent application Ser. No. 687,071 filed Dec. 28, 1985, and assigned to the same assignee as the present application.

This invention relates to well logging and, more particularly, to an apparatus for well logging with electromagnetic energy.

The measurement of dielectric constant (or electric permittivity) of formations surrounding a borehole is known to provide very useful information about the formations. The dielectric constant of the different materials of earth formations vary widely (for example, 2.2 for oil, 7.5 limestone, and 80 for water), so measurement of dielectric properties is a useful means of formation evaluation. As an illustration, if the lithology and the water saturation of a particular formation are determined from conventional well logging techniques, or are otherwise known, it is recognized that the porosity should be determinable if the dielectric constant of the formation could be obtained. Similarly, if the lithology and porosity were given as knowns, information as to the degree of water saturation should be obtainable by measuring the dielectric constant of the formation.

A logging device which improved the art of measuring formation dielectric constant was the electromagnetic propagation tool as disclosed, for example, in the U.S. Pat. No. 3,944,910. As described in the referenced patent, that logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations can then be obtained from the phase and attenuation measurements. Measurements are typically, although not necessarily, made on the formation invaded zone. The configuration of the antennas is an important aspect of successful operation of the described type of logging device. At the relatively high frequency of operation (for example 1100 MHz.) the signal attenuates quite rapidly, so it is important to have transmitting antennas which efficiently generate energy and inject it into the formations, and to have receiving antennas which efficiently receive energy which has propagated through the formations. Since the accuracy of the dielectric constant and conductivity measurements depends upon accurate measurements of attenuation and phase of the received signals, it is essential that the antennas operate in a stable manner over time and that the antennas are in, and remain in, a substantially balanced condition. Further, spurious signal components and the deleterious effects of fringing fields should be minimized.

In the abovereferenced U.S. Pat. No. 3,944,910 the antennas described in the electromagnetic propagation logging device are cavity-backed slot antennas which are filled with a dielectric material and include a probe which is an extension of the center conductor of the coaxial feed to a transmitting antenna (or from a receiving antenna, as the case may be) which extends across the cavity-backed slot in a direction parallel to the axis of the device and has a free end which terminates within a dielectric-filled recess in a side of the cavity-backed slot. Each antenna extends a cavity depth of a quarter wavelength into its metal housing. The length of the cavity-backed slot is a half wavelength.

The described type of cavity-backed slot antenna is inherently tuned at the operating frequency due to its cavity structure. At the relatively low signal levels involved, this tuning helps provide efficient operation at the selected frequency for obtainment of a reasonable signal-to-noise ratio. Some disadvantages are present, however, in the structure and operation of the described type of logging device. As pointed out in the parent application hereof, the dimensions of the cavity-backed slot are a sizeable fraction of a wavelength. As a consequence of the relatively large size, the phase-center of the slot is not well defined and, also, the slot opening can tend to interact substantially with electromagnetic waves propagating near the opening. The cavity-backed slot is inherently narrow band, and this limits the possibility of varying the operating frequency. The drilling borehole is a very difficult operating environment, and the logging device is subjected to a range of pressures, temperatures, and mechanical stresses. Applicant has noted that the incursion of fluid into the dielectric material can be a substantial cause of operating problems in the types of logging devices described above. The dielectric material exposed to the borehole environment can suffer the incursion of water. Water can enter through cracks in the dielectric material (the possibility of such cracks being increased by the hostile environment) and, even without cracks, the dielectric materials may have an inherent degree of porosity which is subject to the incursion of fluids. When a fluid (typically water) enters the dielectric material in the cavity-backed slot, the dielectric constant of the "wet" dielectric can increase substantially over its original "dry" value (since water has a much higher dielectric constant than the dielectric material utilized). Since the wavelength of the operating signal within the cavity-backed slot depends on the dielectric constant of the medium containing the wave, the wavelength of the energy will be changed (shortened in this case due to the high dielectric constant of water), and the operation of the cavity-backed slot antenna will degrade as the cavity goes out of resonance.

The background portion of the parent application hereof further pointed out that the incursion of fluid into the dielectric material of the antenna can also cause a problem because of its effect on the material around the free-ended probe in the described structure. In particular, the probe end in the recess of the antenna wall has a certain inherent capacitance, the value of which will be affected by the dielectric constant of the dielectric material. Again, if the dielectric material becomes "wet", the antenna characteristic will be changed.

It is among the objects of the present invention to generally improve operation of electromagnetic logging devices of the type utilized, inter alia, for determination of formation dielectric constant. It is also among the objects of the present invention to provide an apparatus which is capable of deeper investigation into the formations surrounding the borehole, and which is less adversely affected by the presence of a mudcake of substantial thickness.

SUMMARY OF THE INVENTION

The present invention is directed to an apparatus for investigating formations surrounding a borehole. In accordance with an embodiment of the invention, a logging device is provided, and is moveable through the borehole. A pad member is mounted on the logging device, and is adapted for engagement with the borehole wall. A transmitting antenna is mounted in a wall-engaging face of the member, and a pair of spaced receiving antennas are also mounted in the wall-engaging face of the member, in spaced relation to the transmitting antenna. Each of the transmitting and receiving antennas comprises a conductive metal base (which may or may not be common to one or more of the antennas) having a slot therein which opens toward the borehole wall, and a conductive probe in the slot, the probe extending across the slot in a direction that is perpendicular to the borehole axis and also perpendicular to a borehole radius. Means are provided for energizing the transmitting antenna to transmit electromagnetic energy into the formations by applying a signal to the probe with respect to the base. Means are also provided for generating an output at each of the receiving antennas representative of the electromagnetic energy received from the formations by obtaining a signal at said probe with respect to the base.

The slot and probe orientations of the present invention provide antennas which exhibit a magnetic dipole characteristic having a vertical dipole moment. As described further hereinbelow, this results in a device which can attain deeper investigation into the formations, and is less sensitive to mudcake and invaded zone characteristics. As employed in a propagation logging device operating at a frequency preferably greater than 100 MHz, the use of vertical magnetic dipole slot antennas provides unique advantages in investigation of borehole characteristics. Although this approach at first appears to be inferior due to less signal being coupled between transmitter and receivers, the advantages which attach in terms of depth of investigation outweigh the decrease in received signal strength in many applications.

The slot antennas hereof each have a slot with a length and width that is less than a half wavelength (and preferably less than a quarter wavelength) at the operating frequency in the dielectric material of the slot, and with a depth that is less than a quarter wavelength (and preferably less than an eighth of a wavelength) at the operating frequency in the dielectric material of the slot. Accordingly, the slot is not a resonant cavity at the operating frequency, and there is substantially less sensitivity of the antenna characteristics with respect to factors such as changes in the dielectric filler material due to incursion of water. The size of the slot is small as compared, for example, to the type of cavity-backed slot antennas described in the Background portion hereof. The slot antennas hereof scatter less energy and have less interaction with any spurious electromagnetic components propagating near the slot. The smaller dielectric-filled opening tends to be more rugged and less subject to incursion of fluid or other deleterious effects of the hostile borehole environment. Also, since the antennas have broader band characteristics, efficient operation at different frequencies is possible.

In the preferred embodiment, the probe is shorted at one end to a wall of the slot, so possible changes in capacitance, again caused by a change in the characteristic of the dielectric material, are reduced.

In this preferred embodiment, a tuning element is provided that is separated from the slot and sealed with respect to the slot, so as to isolate the tuning element from environmental perturbations (such as incursion of water or mechanical perturbations) of the dielectric material in the slot. Accordingly, the slot's behavior as a magnetic dipole will not be as greatly altered by a change in the properties of the dielectric material filling the slot, and the separate tuning element will increase the efficiency of antenna operation without being substantially subjected to degradation by the hostile environment.

Further features and advantages of the invention will become more readily apparent from the following detailed description when taken in conjunction with accompanying drawings.

BRIEF DESCRIPTION OF THE DRAWINGS

FIG. 12, which includes

FIG. 18, which includes

DESCRIPTION OF THE PREFERRED EMBODIMENTS

Figure 1:
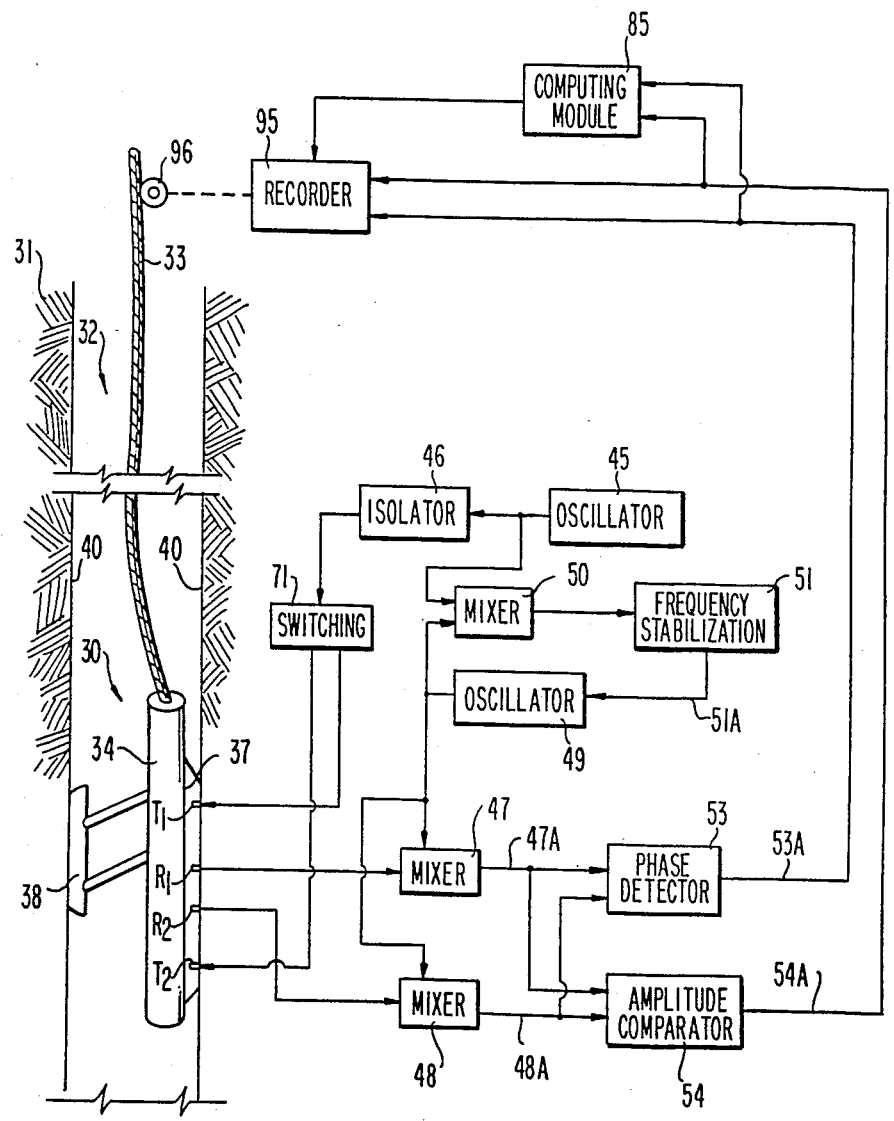
FIG. 1. is a schematic representation, partially in block diagram form, of the type of apparatus which can include the improvements of the invention.

Referring to FIG. 1, there is shown an embodiment of the type of apparatus 30, for investigating subsurface formations 31 traversed by a borehole 32, which includes the improvements as described in the parent application hereof, and can include the further improvements in accordance with this invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 is formed on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a fluid-tight housing containing the bulk of the downhole electronics. Mounted on one side of sonde 34 is a pad 37 which contains, inter alia, vertically spaced transmitting antennas T1 and T2, and vertically spaced receiving antennas R1 and R2 between the transmitting antennas. On the other side of sonde 34 is mounted a backup arm 38 which may be hydraulically controlled to maintain the pad 37 in contact with the borehole wall. The backup arm 38 can also be used to provide a caliper reading. Electronic signals indicative of the information obtained by the logging device are transmitted through the cable 33 to a computing module 85 and a recorder 95, typically located at the surface of the earth. The particular means shown in FIG. 1 for maintaining the antennas in engagement with the borehole wall is illustrative, and it will be appreciated that other known suitable means for accomplishing this objective can be utilized.

The downhole electronics contained within the member 34 are shown, for convenience of illustration, at the side of the borehole. An oscillator 45 provides output energy which, in the present invention, is preferably greater than 100 MHz, and, in the example hereof is 1100 MHz. The output of oscillator 45 is coupled through isolator 46 and switching circuit 71 to the transmitting antennas T1 and T2, respectively. As is well known in the art, the transmitters T1 and T2 can be alternately enabled to implement "borehole compensated" operation. In this regard see, for example, U.S. Pat. No. 3,849,721. As described in that patent, the roles of the receivers are also switched as part of the borehole compensation scheme and to compensate for amplifier drift and other processing instabilities. This type of switching can also be utilized in the context of the present invention. However, the improvements of the present invention are not, per se, directed to borehole compensation or the referenced switching or processing, so for ease of explanation the receivers R1 and R2 will be respectively considered as the near and far receivers during transmission from transmitter T1, and the case of transmission from transmitter T2 will not be described in detail.

Electromagnetic energy is transmitted from transmitter T1 into the surrounding formations. Energy received at receiving antennas R1 and R2 is respectively coupled to input terminals of mixers 47 and 48. As described, for example, in the U.S. Pat. No. 3,944,910, the signals which arrive from R1 and R2 are out of phase with each other by an amount which depends upon properties of the surrounding formations and have an amplitude ratio which also depends upon properties of the surrounding formations. Secondary input terminals of the mixers are supplied with energy at a frequency that is separated from the transmitter frequency by some relatively low frequency which is typically in the kilohertz frequency range. In the embodiment shown, oscillator 49 supplies electromagnetic energy to mixers 47 and 48 at a frequency that is, for example, 10 KHz. above the transmitter frequency. The output signals 47A and 48A of the mixers 47 and 48 therefore contain the difference frequency of 10 KHz. In accordance with well known principles, the signals 47A and 48A maintain the phase and amplitude relationships of the signals from R1 and R2, but the task of phase detection is greatly facilitated at the lower frequency of the mixed signals. To ensure that the difference frequency between the outputs of the oscillators 45 and 49 remains at 10 KHz., the oscillator outputs are sampled and fed to a mixer 50. The output of the mixer is received by a frequency stabilization circuit 51 which detects drifts from the 10 KHz. standard and generates a correction signal 51A which controls oscillator 49 in the manner of a conventional "phase-locked loop".

The signals 47A and 48A are applied to a phase detector circuit 53 and to an amplitude comparator 54. The output of the phase detector 53 is a signal level which is proportional to the phase difference between the signals received at R2 and R1. The output of amplitude comparator 54 is a signal level which is proportional to the relative amplitude of the signal received at R2 with respect to the signal received at R1. Suitable types of phase and amplitude comparator circuits are known in the art. (Also, see the above-referenced U.S. Pat. No. 3,944,910.)

The outputs of the phase detector circuit 53 and the amplitude comparison circuit 54 are transmitted to the surface over the conductor pair 53A and 54A which in actuality pass through the armored cable 33. These signals may be, for example, D.C. levels which are stepped-up by amplification before transmission to the surface, or may be converted to digital form downhole before transmission to the surface.

At the surface of the earth the signals on lines 53A and 54A are recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. In addition to recording the attenuation and phase representative signals on recorder 95, these signals may also typically be coupled to a computing module 85. The computing module may include processing means for determining the dielectric constant and/or the conductivity of the invaded zone of the surrounding formations. The recording means may alternately include processing means for determining other parameters of the surrounding formations, as is known in the art. It will be understood that the present invention is directed to improvements in the structure of the logging device, and is not limited by the manner in which detected signals are processed. In this same context it will be recognized that while differential measurements of phase and attenuation are set forth in the described embodiment, absolute measurements of phase and/or amplitude relative to the transmitter may be taken and utilized, if desired. In some cases, measurements can also be useful in a determination of mudcake resistivity and thickness.

Figure 2:
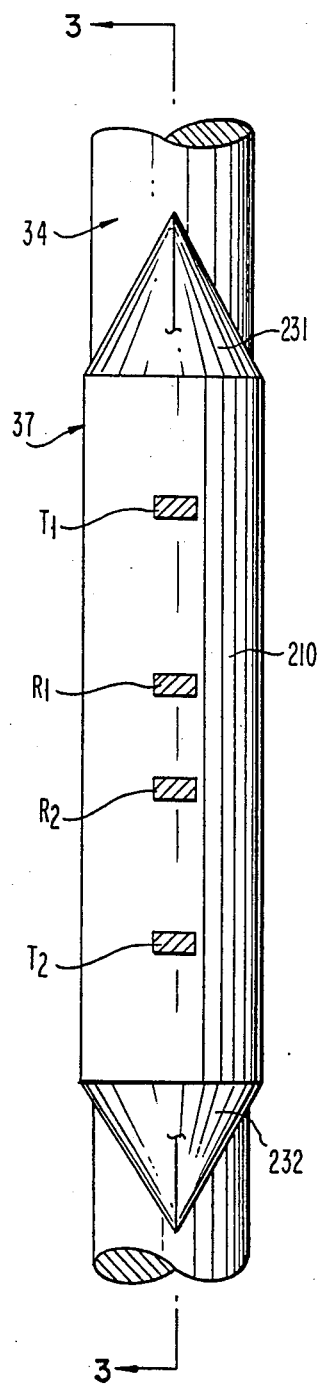
FIG. 2 is a front view of the pad member of logginq device of FIG. 1.
Figure 3:
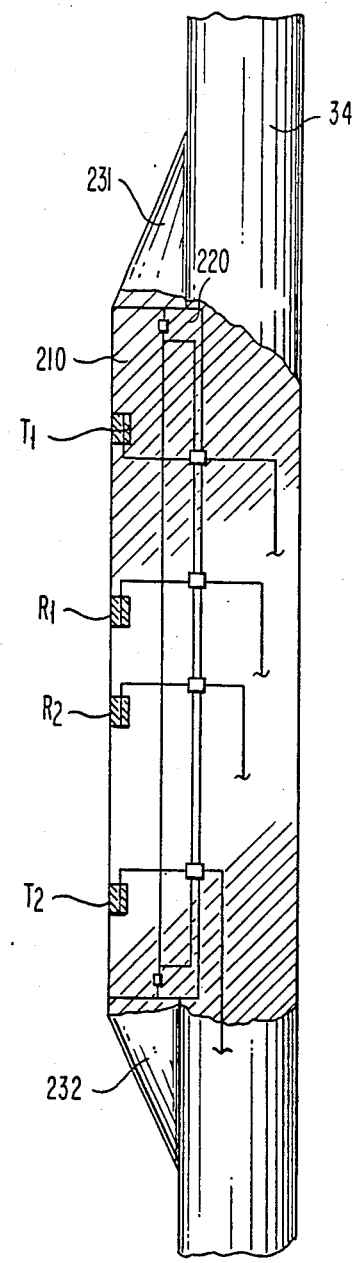
FIG. 3 is a cross-sectional view of the pad member of FIG. 2, as taken through a section defined by the arrows 3—3 of FIG. 2.

FIGS. 2 and 3 illustrate a form of the pad 37 in accordance with an embodiment of the invention as described in the parent application hereof. The pad is mounted in an opening in the sonde 34, and includes a metal base 210 in which the antennas T1, R1, R2, and T2 are formed. In the present embodiment, the base 210 comprises four metal sections secured to a frame 220 under the base. The frame 220 includes openings through which the coaxial lines pass to and from the sonde 34, where they are coupled to the circuitry such as is represented in FIG. 1. Metal end ploughs 231 and 232 are utilized to cut through the mudcake and facilitate movement of the pad along the borehole wall.

Figure 4:
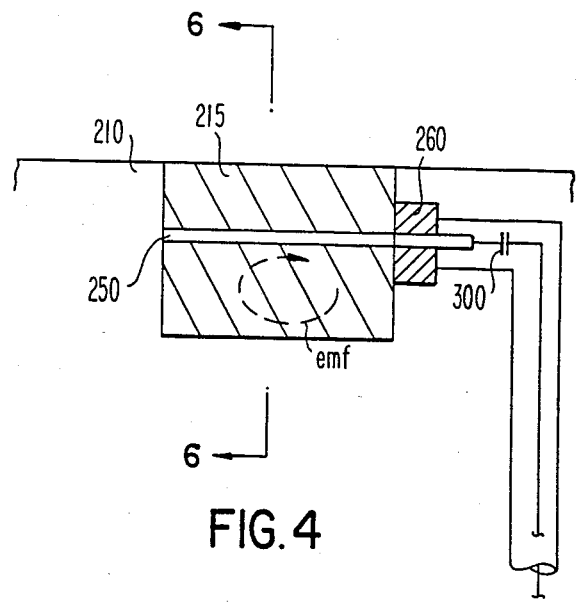
FIG. 4 is a cross-sectional view of an antenna in accordance with an embodiment of the invention.
Figure 5:
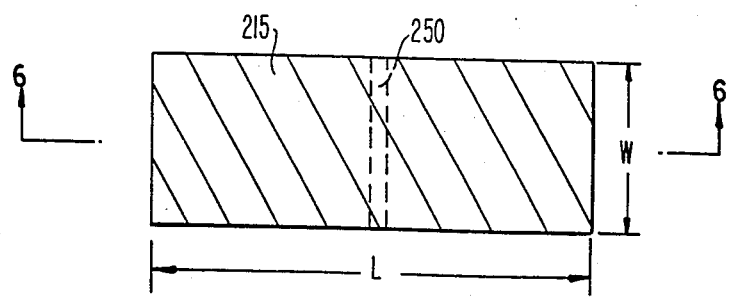
FIG. 5 is a top view of the antenna of FIG. 4.
Figure 6:
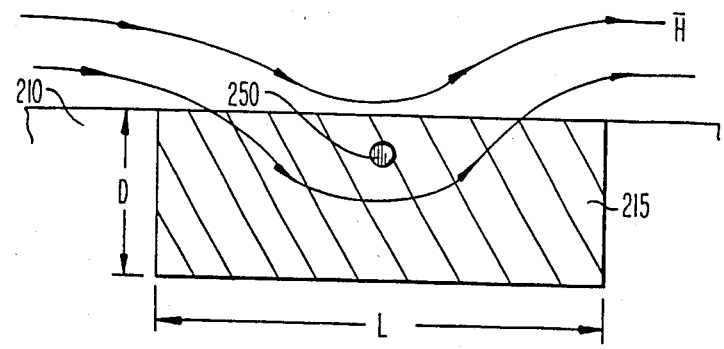
FIG. 6 is cross-sectional view of the antenna of FIGS. 4 and 5, as taken through a section defined by the arrows 6—6 of FIG. 4 and FIG. 5.

The slot antennas utilized in the parent application hereof as the transmitting and receiving antennas are shown in greater detail in FIGS. 4–6. The slot antennas are each formed by a slot in the metal base 210 and are filled with a dielectric material 215 having a dielectric constant of, for example, about 5. The slots have a length and a width that are both less than a half wavelength and a depth that is less than a quarter wavelength at the operating frequency in the dielectric material that fills the slot, so there will be no standing waves in the slot. Preferably, the length and width will both be less than one-quarter wavelength, and the depth less than one-eighth wavelength at the operating frequency in the dielectric material.

In the embodiment of FIGS. 4–6, a conductive probe rod, or wire, 250 extends across the slot in a direction parallel to the borehole axis, and is shorted, at one end, to the slot wall in base 210. The other end of probe 250 passes through an insulating ceramic pressure seal 260, and is coupled to one end of a tuning element 300 which, in the present embodiment, is represented by a capacitor. The seal 260 serves to isolate the tuning element from the slot environment, to prevent any incursion of water or other substance, or from mechanical perturbations which might change or degrade the characteristics of the tuning element. The slot antenna as described acts as a magnetic dipole oriented parallel to the plane of the pad member. Since the slot behaves essentially inductively, the tuning element is substantially capacitive, although it will be understood that some inductive tuning can be employed to tune parasitic capacitance. The tuning element 300 may be a lumped capacitor, shunt stub or other suitable element. In the present embodiment, the other end of capacitor 300 is coupled to the center conductor of a coaxial line, the outer conductor of which is coincident with, or coupled to, the metal base 210. Each coaxial line is coupled to a connector, as represented in FIG. 3, for connection to the appropriate transmitter or receiver line.

Magnetic fields are parallel to the surface of a good conductor, while electric fields are normal to the surface. A small hole in the surface of a conductor allows some of the magnetic and electric fields to penetrate into the hole. If the dimensions of the hole are small compared to a wavelength, it has been shown that the hole can be modelled as the sum of a magnetic dipole parallel to the plane of the conductor and an electric dipole perpendicular to the plane of the conductor (see, for example, H. A. Bethe, "Theory of Diffraction of Small Holes", Phys. Rev. vol. 66, pp. 163-14 182, 1944). The antennas hereof make use of the magnetic dipole component of the hole, but not the electric dipole component. When a magnetic field is present, as illustrated by the field lines in FIG. 6, some amount of magnetic flux leaks into the hole (i.e. the slot) and generates an electromotive force around the loop formed by the probe and the back and side walls of the slot (see FIG. 4). This electromotive force is proportional to the strength of the initial magnetic field and the area under the probe. The effective magnetic dipole moment of the antenna is parallel to the plane in which the slot is cut, and perpendicular to the direction of the probe.

Figure 7:
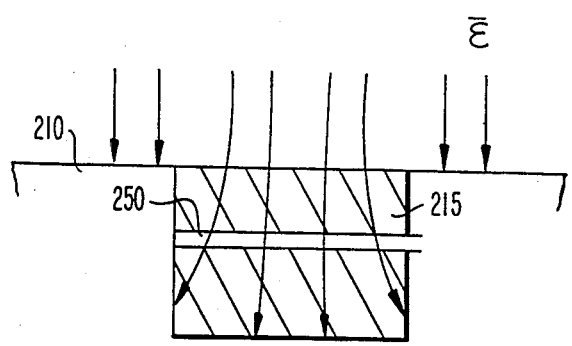
FIG. 7 illustrates electric field lines entering the slot of the FIG. 4 representation.
Figure 8:
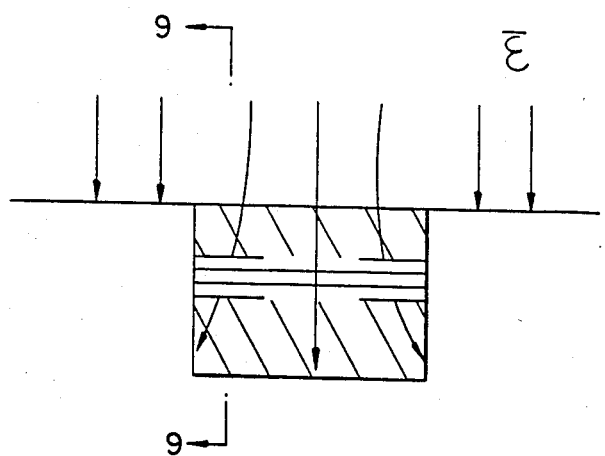
FIG. 8 is a cross-sectional view like FIG. 4, but with shielding provided around the antenna probe.
Figure 9:
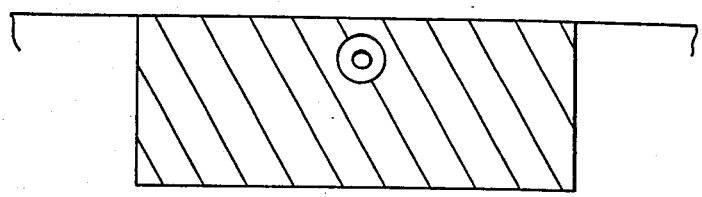
FIG. 9 is a cross-sectional view of the FIG. 8 embodiment, as taken through a section defined by arrows 9—9 of FIG. 8.

When an electric field is present, as shown in the diagram of FIG. 7, it can penetrate into the slot and produce a signal in the probe. This is a parasitic effect in a magnetic dipole antenna, but the arrangement of the probe and the relatively small size of the slot causes the magnetic dipole to dominate the electric dipole of the antenna. Only the electric field components parallel to the probe can induce currents in the probe. Thus the fringing fields at the side walls of the slot contribute most strongly to the parasitic component. Since these fields fringe in opposite directions at the two side walls, their effects tend to cancel. The degree of cancellation is high if the slot is much narrower than a wavelength, as herein, since the phase and amplitude of the electric field across the slot will be fairly constant. To reduce the electric dipole moment, the antenna can be modified as shown in FIGS. 8 and 9. In this embodiment, the probe is rendered less sensitive to the electric field by enclosing all but its center in a shield. The shield consists of two outer cylindrical conductors that are shorted to the slot walls. The gap between the cylinders is placed exactly in the middle of the slot, which renders this design highly symmetric. Most of the electric lines that penetrate into the slot terminate on the shield and do not excite the probe itself. Since the shield is opened in the center, the electromotive force induced by the magnetic field still excites the probe.

The antennas hereof can be modelled as electric current loops above a ground plane, the probe and the slot forming the loop. Outside the source, a horizontal magnetic dipole (for the case of a probe parallel to the borehole axis, as described thus far) of strength m can be substituted for the current loop. If the current on the probe is I, then $m = 2AI$, where A is the effective area of the antenna. The factor of 2 occurs because the ground plane adds a dipole image in phase with the source dipole. In this case, the magnetic field at the pad surface at a receiving antenna due to the transmitting antenna can be expressed as $$Hy = \frac{-mk^{*2}}{4\pi r} e^{jk^*r}\left[1 + \frac{j}{k^*r} - \frac{1}{k^{*2}r^2}\right] \quad (1)$$

where k* is the formation complex propagation constant and r is distance between the two antennas. The received signal at the coaxial line, V, will be proportional to Hy. The ratio of the near receiver signal to the far receiver signal is $$\frac{V_{near}}{V_{far}} = \frac{r_{far}}{r_{near}} e^{jk^*(r_{near}-r_{far})} \frac{\left[1 + \frac{j}{k^*r_{near}} - \frac{1}{k^{*2}r_{near}^2}\right]}{\left[1 + \frac{j}{k^*r_{far}} - \frac{1}{k^{*2}r_{far}^2}\right]} \quad (2)$$

This can be expressed in terms of k*, as $$k^* = \left(\frac{-j}{r_{near} - r_{far}}\right)\left\{j\theta + \frac{G}{20}\ln 10 + \ln\left(\frac{r_{near}}{r_{far}}\right) + \ln\left\{\frac{\left[1 + \frac{j}{k^*r_{near}} - \frac{1}{k^{*2}r_{near}^2}\right]}{\left[1 + \frac{j}{k^*r_{far}} - \frac{1}{k^{*2}r_{far}^2}\right]}\right\}\right\} \quad (3)$$

where the ratio $V_{near}/V_{far}$ has been put in the form $$\frac{V_{near}}{V_{far}} = 10^{\frac{G}{20}} e^{j\theta} \quad$$

where G is magnitude of the signal ratio in db, and $\theta$ is the phase of the signal ratio in radians. After obtaining G and $\theta$ (e.g. using the type of circuitry shown in FIG. 1), k* can be determined using relationship (3). In particular, since typically $|k^*r_{near}|$ or $|k^*r_{far}|$ is $>>1$, the natural log of the last bracketed term of relationship (3) is close to zero, k* can be solved for, as a first approximation, without such term. The k* obtained in this way can then be used on the righthand side of the complete expression (3) to obtain a better value of k*, and the procedure will converge quickly to a solution value of k*. The dielectric constant $\epsilon'$ and conductivity $\tau$ can then be obtained using $$\epsilon' = \frac{k'^2 - k''^2}{k_o^2} \quad (4)$$

$$\sigma = \frac{2k'k''}{k_o^2}[\omega\epsilon_o] \quad (5)$$

where k' and k" are respectively the real and imaginary parts of k*, $k_o$ is the free space propagation, and $\omega$ the angular frequency of operation. As noted in the parent application hereof, alternatives to the iterative numerical solution set forth would be a table look-up technique or a curve matching technique, both well known in the art. A further possible approach is to provide a special purpose analog or digital processor which provides output functions that represent the relationships set forth. It will also be recognized that by using the described logging device in a suitably large test pit borehole, stored values can be obtained empirically.

Figure 10:
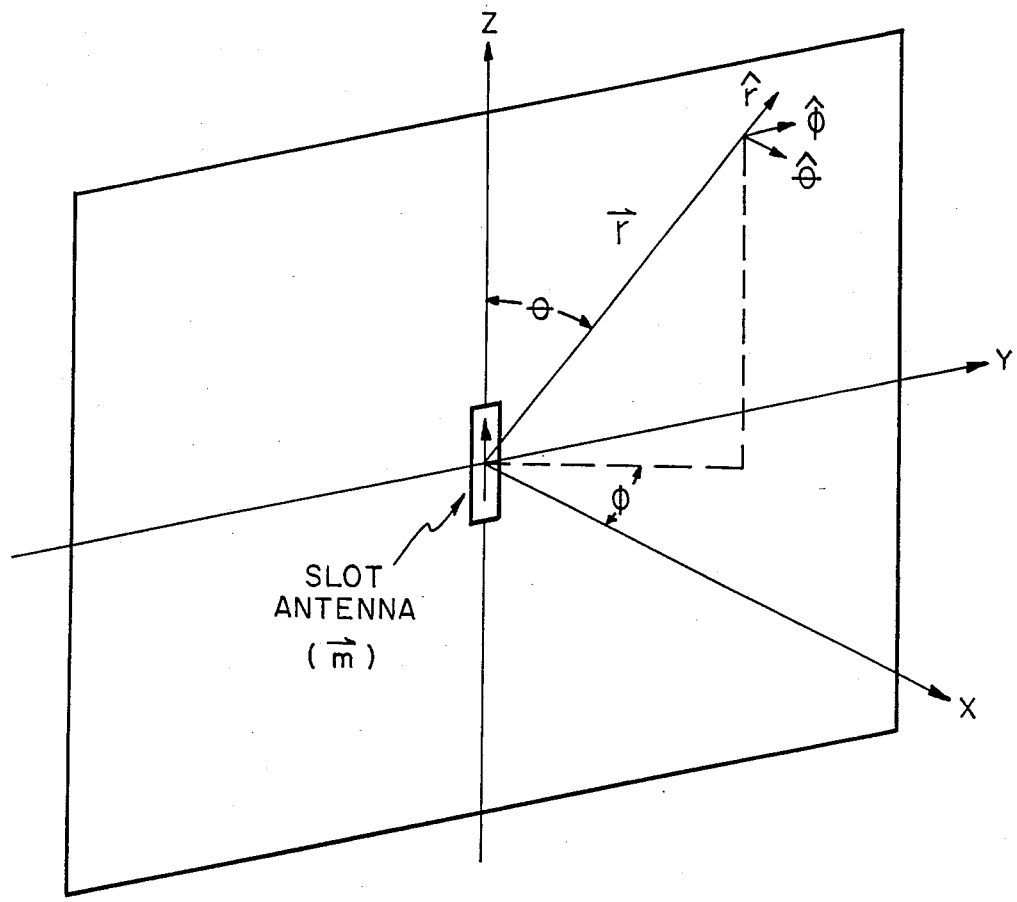
FIG. 10 shows a coordinate system with a vertical magnetic dipole located at the origin.

The equations first set forth above are for a horizontal magnetic dipole (i.e., a dipole having a magnetic moment that is horizontal with respect to the "vertical" axis of the borehole—represented herein as the z-axis of a coordinate system). Consider now the coordinate system and the formulas for a magnetic dipole located at the origin, as shown in FIG. 10, and having its magnetic moment aligned along the z-axis. In polar coordinates, the formulas, which are applicable for a magnetic dipole mounted on a conductive plate in the y,z plane, and where the half-space x>o can be filled with a material of arbitrary dielectric constant and conductivity, are as follows:

$$H_r = \frac{-mjk^*r}{2\pi r^3}\left(1 + \frac{j}{k^*r}\right)\cos\theta e^{j(k^*r-\omega t)} \quad (6)$$

$$H_\theta = \frac{-mk^{*2}}{4\pi r}\left(1 + \frac{j}{k^*r} - \frac{1}{k^{*2}r^2}\right)\sin\theta e^{j(k^*r-\omega t)} \quad (7)$$

$$E_\phi = \frac{mk^{*2}}{4\pi r}\sqrt{\frac{\mu}{\epsilon'}}\left(1 + \frac{j}{k^*r}\right)\sin\theta e^{j(k^*r-\omega t)} \quad (8)$$

where $H_r$ and $H_\theta$ are, respectively, the magnetic fields in the r and $\theta$ directions, $E_\phi$ is the electric field in the $\phi$ direction, $\vec{m} = \hat{m}z$ is the magnetic dipole moment of the slot antenna, and the propagation constant k* is represented by $$k^* = \frac{\omega}{c}\sqrt{\epsilon' + j\frac{\tau}{\epsilon_o\omega}} \quad (9)$$

Figure 11:
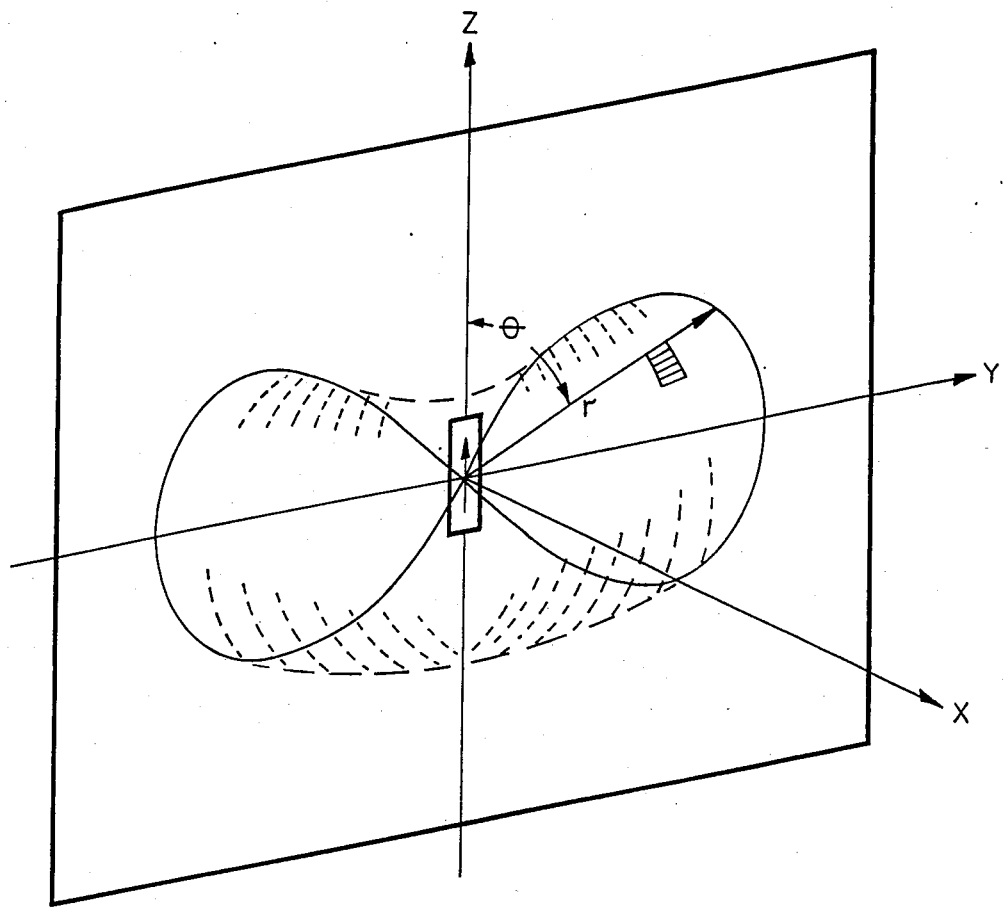
FIG. 11 illustrates the radiation pattern for a vertical magnetic dipole.

[see, for example, Stratton, "Electromagnetic Theory", published by McGraw Hill, N.Y., 1941, pg. 437.] The radiation pattern (or power distribution) for the vertical magnetic dipole (with the magnetic moment in the z-direction is shown in FIG. 11—which can be visualized as a half surface of revolution of the solid line pattern on the y-z plane. The radial time-averaged power depends on the angle $\theta$ between the radial direction (r) and the z-axis as $$P(\theta) = P_o \sin^2\theta \quad (10)$$

It is seen that the radiated power from the vertical magnetic dipole antenna (e.g. a transmitter) is maximum in the x-y plane and minimum along the z-direction. When the vertical magnetic dipole antenna is considered as a receiver, according to the reciprocity theorem, the directional sensitivity has the same pattern; i.e., maximum sensitivity to radiation arriving in the x-y plane and minimum sensitivity to radiation arriving from the z-direction.

Figure 12C:
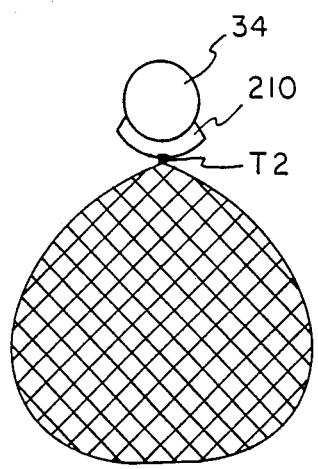
FIGS. 12A, 12B and 12C, show radiation patterns for an antenna acting as a horizontal magnetic dipole.
Figure 12A:
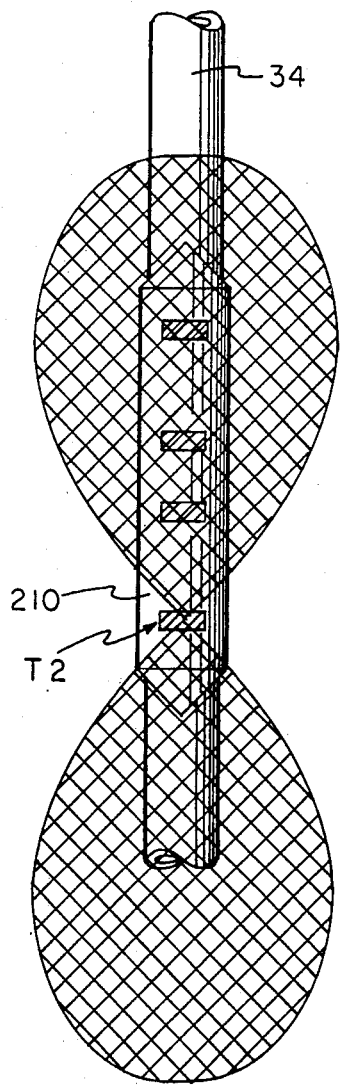
Figure 12B:
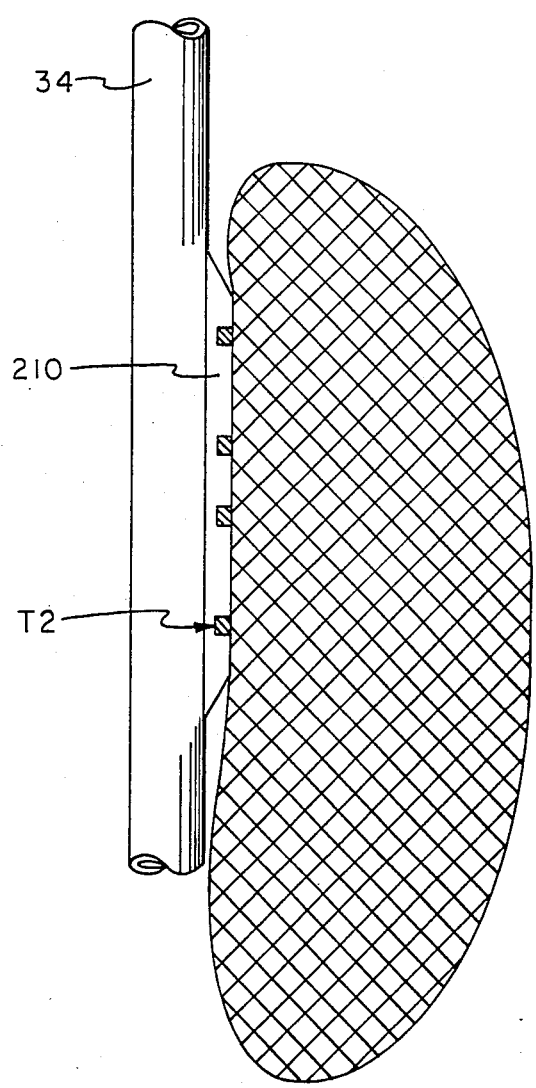
Figure 13:
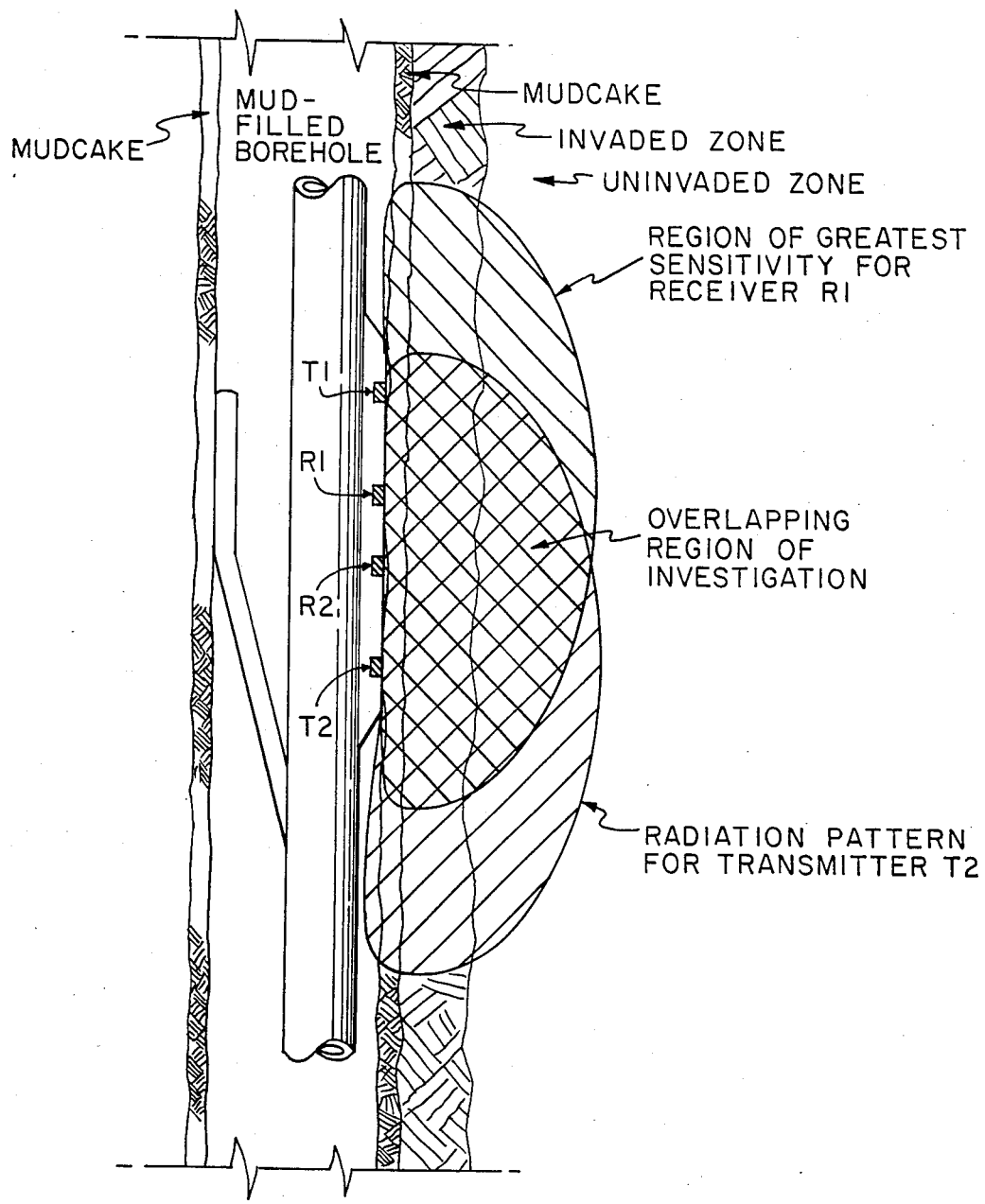
FIG. 13 shows a side view of the radiation and sensitivity patterns of transmitting and receiving antennas acting as horizontal magnetic dipoles.
Figure 14:
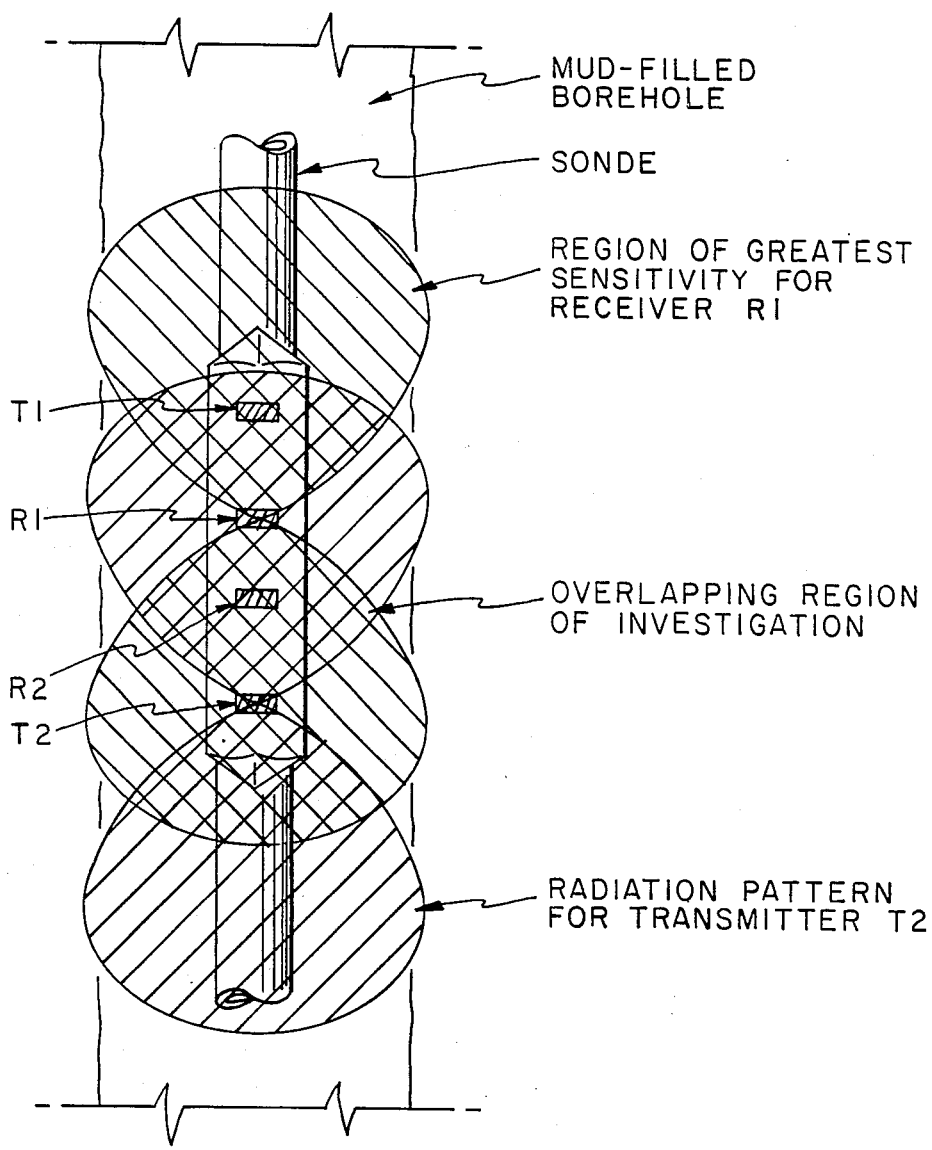
FIG. 14 is a front view of the radiation and sensitivity patterns of the FIG. 13 illustration.

FIG. 12 shows the type of radiation pattern obtained using the embodiment of FIGS. 2, 3; i.e. with the antenna probes parallel to the device (and borehole) axis, which results in a horizontal magnetic dipole (using the directional convention hereof). In FIG. 12A the characteristic pattern of FIG. 11 is seen, but it is rotated 90° since the magnetic dipole moment is horizontal in this case. In the views of FIGS. 12A, 12B and 12C, the radiation pattern is shown as emanating from the transmitter T2 (for example). The receiving antennas in the FIGS. 2,3 embodiment are also horizontally aligned magnetic dipole antennas and have regions of greatest sensitivity with substantially the same pattern as in FIG. 12. FIG. 13 shows the side view of the sensitivity pattern of receiver R2 (for example) in conjunction with the transmitter pattern from antenna T2. The checkerboard cross-hatched portion represents the region where the patterns overlap, and which therefore most strongly affects the signal going (in this example) between transmitter T2 and receiver R1. In FIG. 13 the logging device (FIGS. 2,3 embodiment) is shown abutting a borehole wall with a given exemplary mudcake thickness and invaded zone thickness. In this example it is seen that a significant fraction of the energy detected by the receiver will have travelled in the mudcake or in the invaded zone. Accordingly, the measurement using the FIGS. 2,3 embodiment is relatively shallow. FIG. 14 shows a face-on view of the FIG. 13 situation.

Figure 15:
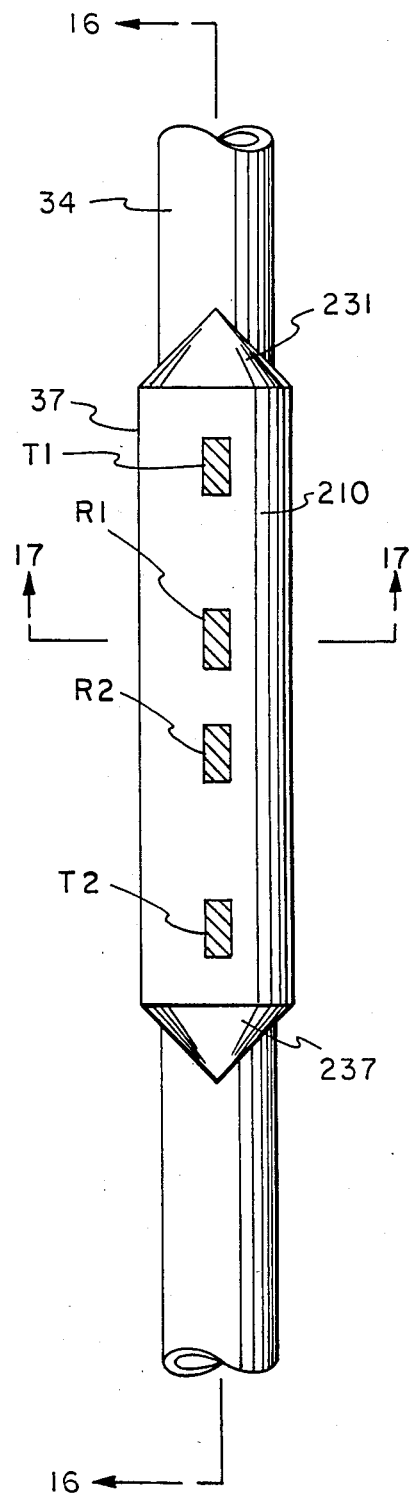
FIG. 15 is a front view of the pad member of a logging device in accordance with an improvement of the invention, and which utilizes antennas oriented as vertical magnetic dipoles.
Figure 16:
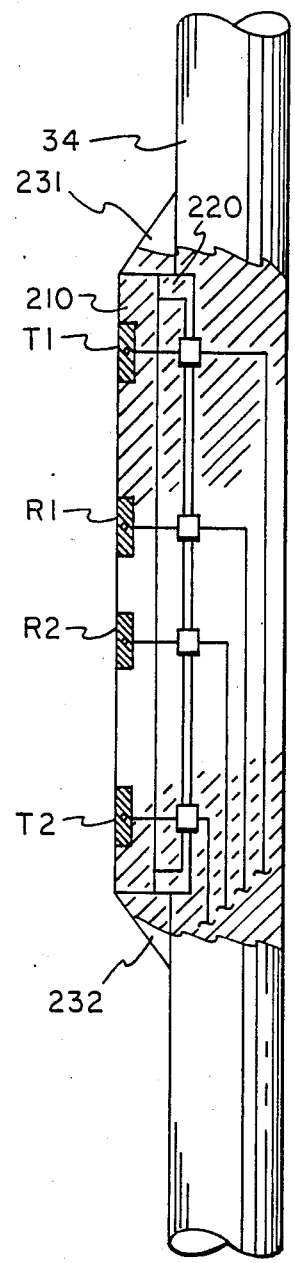
FIG. 16 is a cross-sectional view of the pad member of FIG. 15, as taken through a section defined by the arrows 16—16 of FIG. 15.
Figure 17:
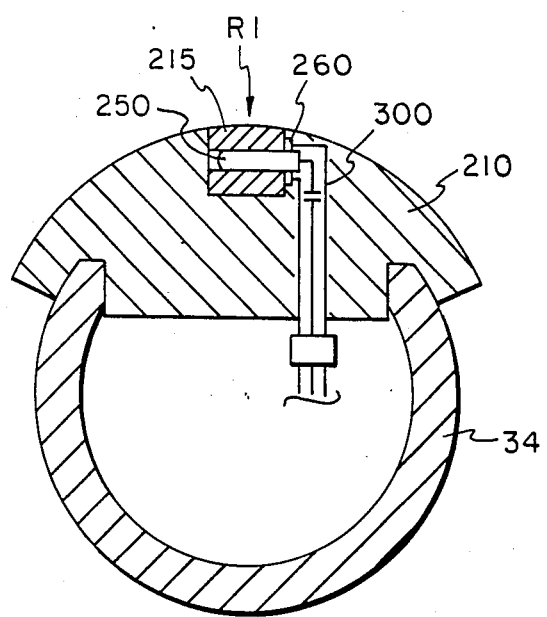
FIG. 17 is a cross-sectional view of the pad member of FIG. 15, as taken through a section defined by the arrows 17—17 of FIG. 15.

Now, consider the embodiment of FIGS. 15, 16 and 17 wherein the slots and probes of the transmitting and receiving antennas are "rotated" 90° with respect to their orientations in the FIGS. 2,3 embodiment. Accordingly, the probes in the respective slots are perpendicular to the device (and borehole) axis, and also perpendicular to the borehole radius. This results in the antennas having effective dipole moments in the vertical direction, and being characterized by the radiated and received patterns described in conjunction with FIG. 11. The equations used to obtain $\epsilon'$ and $\tau$ are as set forth in conjunction with FIG. 10. These lead to the following expressions which would replace equations (2) and (3) above $$\frac{V_{near}}{V_{far}} = \left(\frac{r_{far}}{r_{near}}\right)^2 e^{jk^*(r_{near}-r_{far})} \frac{\left[1 + \frac{j}{k^* r_{near}}\right]}{\left[1 + \frac{j}{k^* r_{far}}\right]} \quad (11)$$

$$k^* = \left(\frac{-j}{r_{near} - r_{far}}\right) \left\{ j\theta + \frac{G}{20} \ln 10 + 2\ln\left(\frac{r_{near}}{r_{far}}\right) + \ln\left[\frac{1 + \frac{j}{k^* r_{near}}}{1 + \frac{j}{k^* r_{far}}}\right] \right\} \quad (12)$$

The techniques described can then be used to solve for values of dielectric constant and permittivity. In other respects, the logging device may be of the type described in conjunction with FIGS. 1-9. The slots can be dimensioned as previously described, and, for example, the tuning techniques previously set forth can be employed. The reference numerals of FIGS. 15-17 correspond with like reference numerals of components of the previously described embodiment.

Figure 18C:
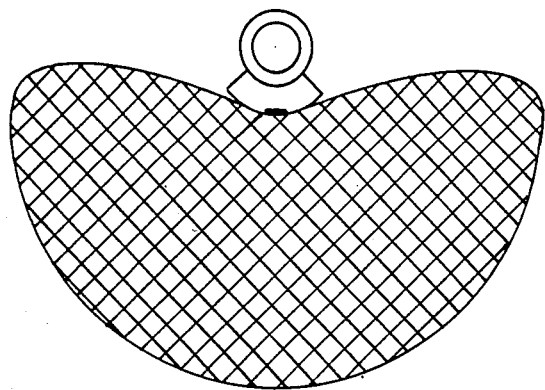
FIGS. 18A, 18B and 18C, shows the type of radiation pattern obtained using the embodiment of FIGS. 15-17, which result in a vertical magnetic dipole characteristic.
Figures 18A, 18B:
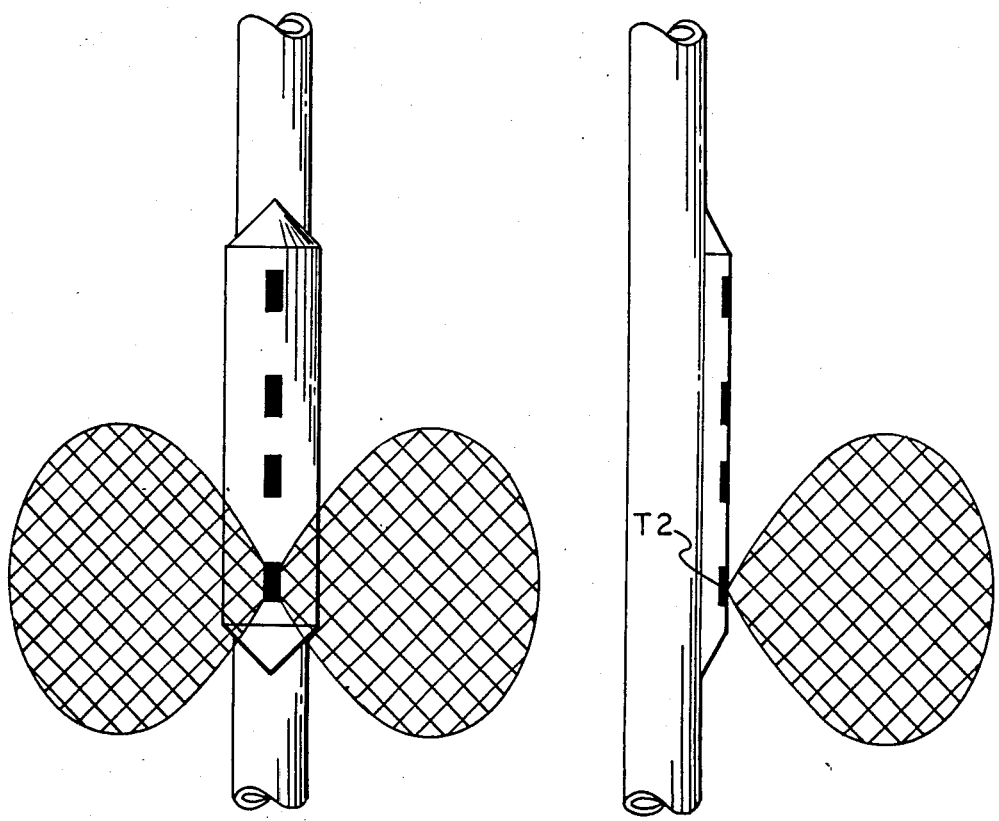
Figure 19:
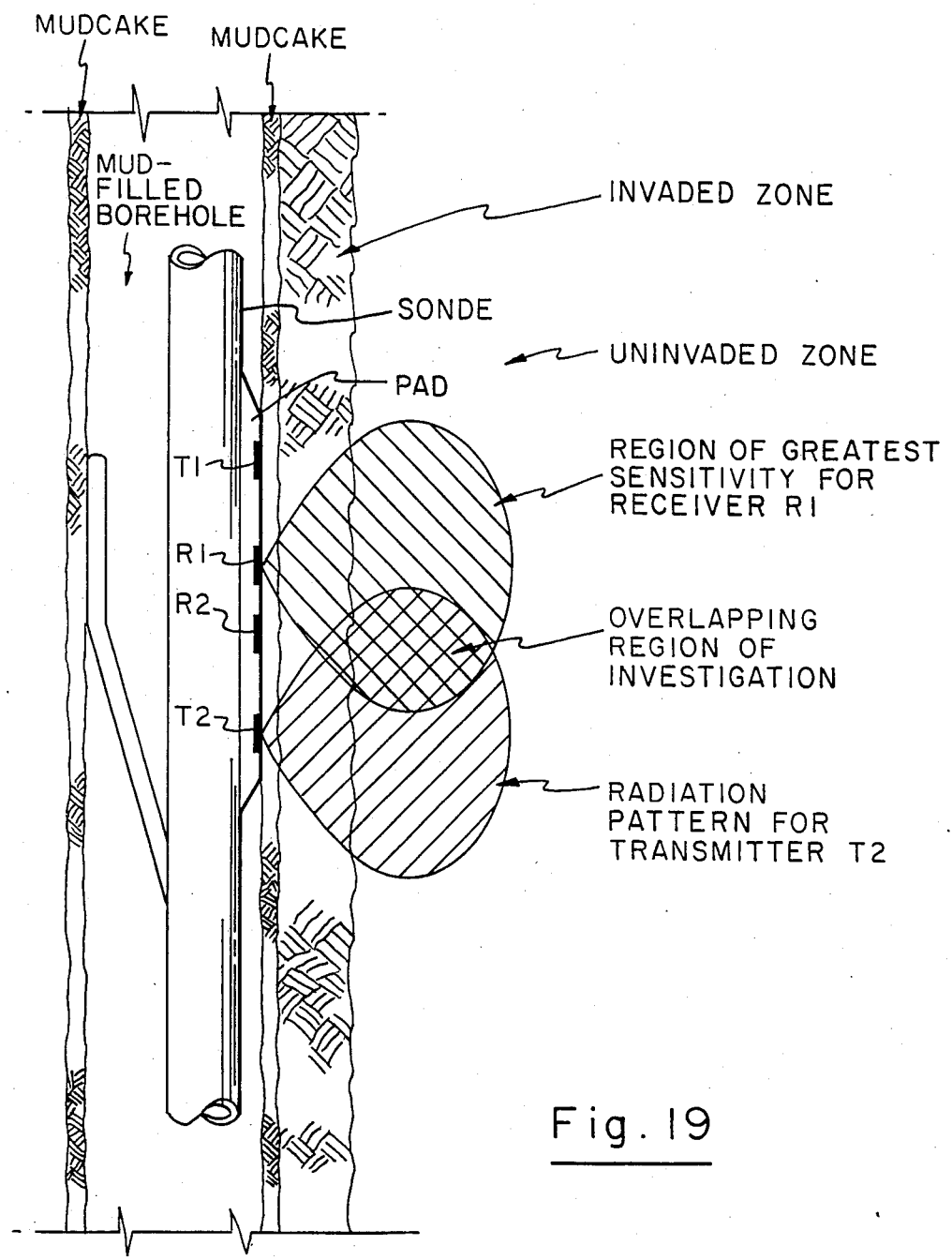
FIG. 19 shows a side view of the radiation and sensitivity patterns of transmitting and receiving antennas acting as vertical magnetic dipoles.
Figure 20:
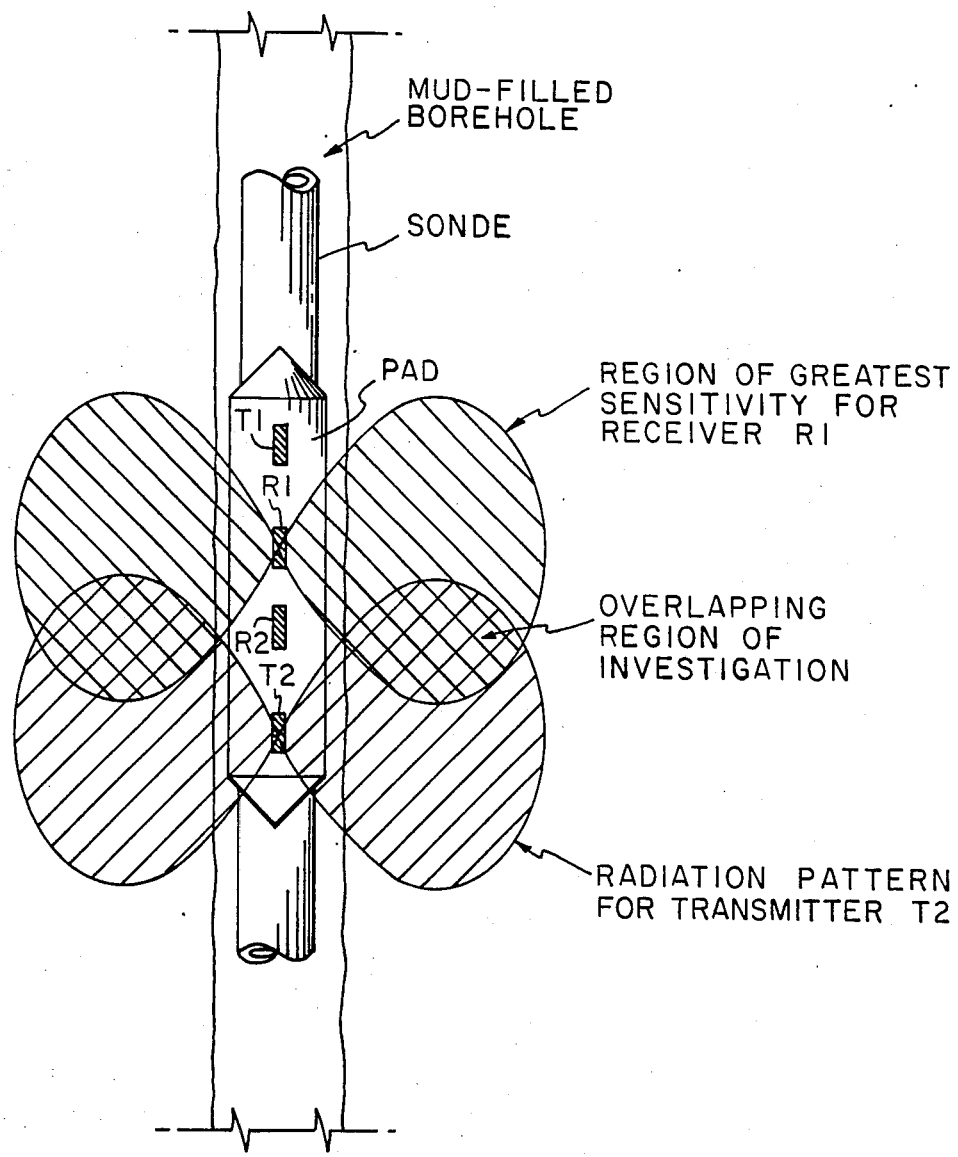
FIG. 20 is a front view of the radiation and sensitivity patterns of the FIG. 19 illustration.

FIG. 18 shows the type of radiation pattern obtained using the embodiment of FIGS. 15-17; i.e., slot antenna and probe orientations which result in a vertical magnetic dipole characteristic. Compare the front, side, and cross-sectional views of FIGS. 18A, 18B and 18C, respectively, to those of the corresponding views of FIGS. 12A, 12B and 12C. FIG. 19, like its counterpart FIG. 13 for the horizontal magnetic dipole case, shows the side view of the vertical magnetic dipole sensitivity pattern of receiver R2 (for example) in conjunction with the transmitter pattern from the vertical magnetic dipole antenna T2. Again, the checkerboard cross-hatched portion represents the region where the patterns overlap, and which therefore most strongly affects the signal going (in this example) between transmitter T2 and receiver R1. For the same example of a given mudcake thickness and invaded zone thickness as in FIG. 13, the overlap is seen to occur deeper in the formation. This means that much less of the energy detected by the receiver will have travelled through the mudcake or through the shallow region near the borehole. FIG. 20 also illustrates the substantially deeper investigation resulting from the measurement taken with the vertical magnetic dipole antennas of the FIGS. 15-17 embodiment (compare FIG. 14, which was for the horizontal magnetic dipole case).

Figure 21:
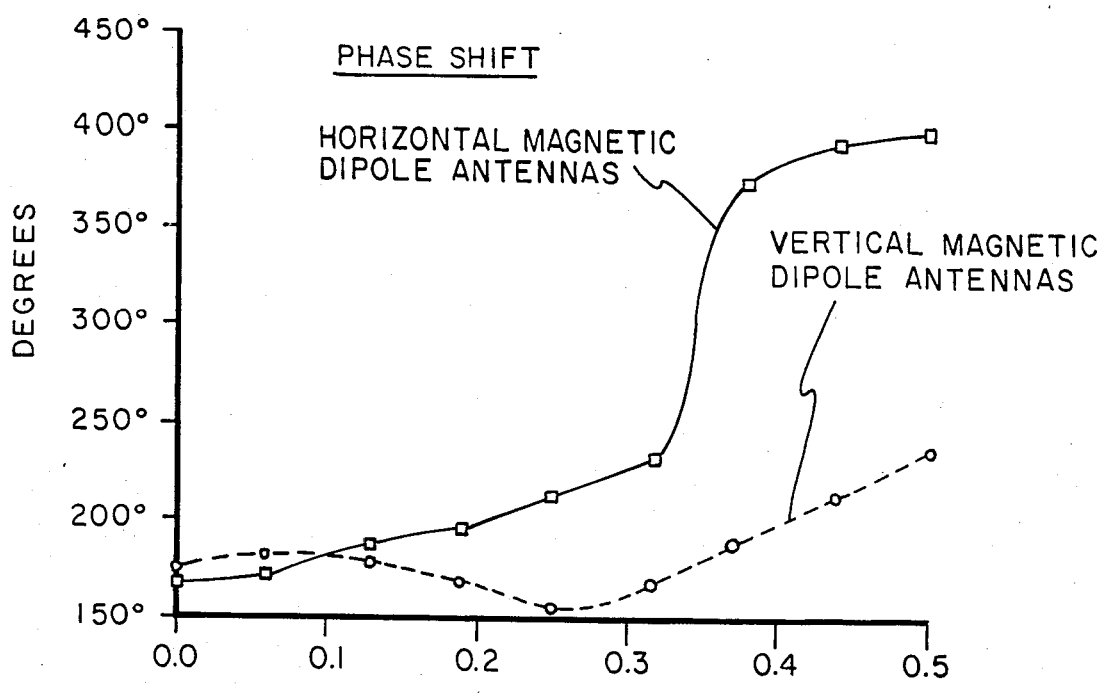
FIG. 21 shows phase shift data for an experiment performed using horizontal magnetic dipole antennas and vertical magnetic dipole antennas.
Figure 22:
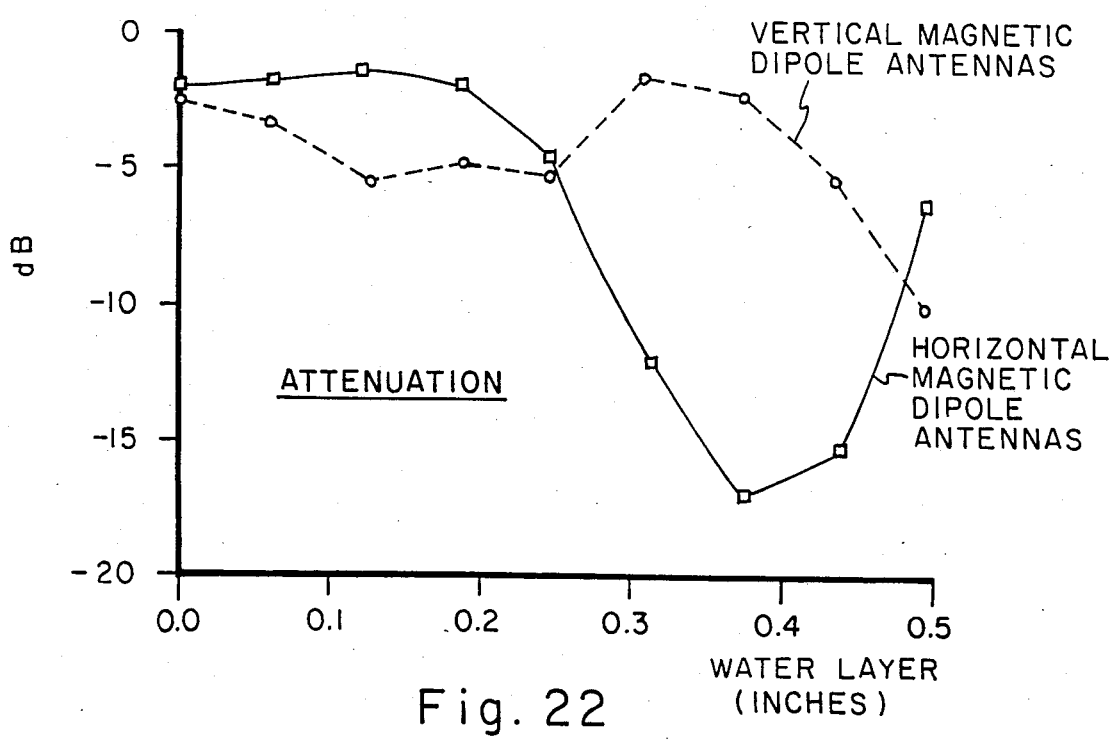
FIG. 22 shows attenuation data for an experiment performed using horizontal magnetic dipole antennas and vertical magnetic dipole antennas.

FIGS. 21 (phase shift data) and 22 (attenuation data) each show experimental results obtained using the slot antennas of the FIG. 2,3 embodiment (horizontal magnetic dipole) as compared to the slot antennas of the FIGS. 15-17 embodiment (vertical magnetic dipole). The arrays used both had one transmitting antenna and two receiving antennas, and were the same except for the orientation of the antennas. The distances between the transmitting antenna and the receiving antennas were 8 and 12 cm., respectively. The frequency used was 1100 MHz. FIG. 21 shows the phase shift measured between the two receivers, and FIG. 22 shows the attenuation measured between the receivers, both as a function of the thickness of a water layer between the device pad and a large sandstone block saturated with 1 ohm-meter water. The water thickness was varied between 0 and 0.5 inch. When there is no water layer (or a very thin water layer) between the pad and the simulated rock formation, the phase shifts for both arrays were found to be characteristic of the rock formation's known dielectric constant and conductivity. As the thickness of the water layer increases, the phase shift obtained with the FIG. 2,3 embodiment (horizontal magnetic dipole) increases rapidly until it largely represents the properties of the water layer. Hence, at ½ inch of water layer, this array is seen to be measuring properties of the water layer much more so than properties of the formation. Regarding the attenuation data (FIG. 22), when there is no water layer or a small water layer, the attenuations measured by both arrays are similar after the data has been corrected for spreading losses. [The spreading loss for the array of the FIG. 2,3 embodiment is 3.5 dB, while that for the embodiment of FIGS. 15-17 is 7 dB.] Again, the FIGS. 15-17 embodiment (vertical magnetic dipole) was found to provide a better measure of the formation's attenuation when a substantial water layer interface is present, and accordingly a deeper investigation into the formation is indicated.

The invention has been described with reference to particular preferred embodiments, but variations within the spirit and scope of the invention will occur to those skilled in the art. For example, while two receivers and two transmitters are shown in an illustrated embodiment, it will be understood that three or more receivers and/or one or more transmitters could be employed. Further, it will be recognized that tapered slots can be employed, if desired. Also, the operating frequency could be varied, uphole or downhole, and before or during a logging run. Finally, the antenna arrays hereof can be utilized, if desired, on more than one pad, such as in a dipmeter logging application.

I claim:

1. Apparatus for investigating formations surrounding a borehole, comprising:
a logging device moveable through the borehole;
a member mounted on the logging device and adapted for engagement with the borehole wall;
a transmitting antenna mounted in a wall-engaging face of said member;
a pair of spaced receiving antennas mounted in the wall-engaging face of said member in spaced relation to said transmitting antenna;
each of said antennas comprising: a conductive base having a slot therein which opens toward the borehole wall, and a conductive probe in said slot, said probe extending across said slot in a direction that is perpendicular to the borehole axis and also perpendicular to a borehole radius;
means for energizing said transmitting antenna to transmit electromagnetic energy into said formations by applying a signal to said probe with respect to said base; and
means for generating an output at each of said receiving antennas representative of electromagnetic energy received from the formations by obtaining a signal at said probe with respect to said base.

2. Apparatus as defined by claim 1, wherein said slot is substantially filled with a dielectric material.

3. Apparatus as defined by claim 1, wherein said probe is shorted at one end to a wall of said slot.

4. Apparatus as defined by claim 2, wherein said probe is shorted at one end to a wall of said slot.

5. Apparatus as defined by claim 2, wherein each of said antennas further comprises a tuning element separate from said slot, said transmitted or received signal, as the case may be, being coupled to said probe via said tuning element.

6. Apparatus as defined by claim 4, wherein each of said antennas further comprises a tuning element separate from said slot, said transmitted or received signal, as the case may be, being coupled to said probe via said tuning element.

7. Apparatus as defined by claim 5, wherein said tuning element is a capacitive tuning element.

8. Apparatus as defined by claim 6, wherein said tuning element is a capacitive tuning element.

9. Apparatus as defined by claim 7, further comprising sealing means separating said tuning element from said slot.

10. Apparatus as defined by claim 8, further comprising sealing means separating said tuning element from said slot.

11. Apparatus as defined by claim 1, wherein the length and width of said slot are less than a half wavelength at the operating frequency in the dielectric material of said slot, and wherein the depth of said slot is less than a quarter wavelength at the operating frequency in the dielectric material of said slot.

12. Apparatus as defined by claim 2, wherein the length and width of said slot are less than a half wavelength at the operating frequency in the dielectric material of said slot, and wherein the depth of said slot is less than a quarter wavelength at the operating frequency in the dielectric material of said slot.

13. Apparatus as defined by claim 5, wherein the length and width of said slot are less than a half wavelength at the operating frequency in the dielectric material of said slot, and wherein the depth of said slot is less than a quarter wavelength at the operating frequency in the dielectric material of said slot.

14. Apparatus as defined by claim 1, wherein the length and width of said slot are less than a quarter wavelength at the operating frequency in the dielectric material of said slot, and wherein the depth of said slot is less than an eighth of a wavelength at the operating frequency in the dielectric material of said slot.

15. Apparatus as defined by claim 2, wherein the length and width of said slot are less than a quarter wavelength at the operating frequency in the dielectric material of said slot, and wherein the depth of said slot is less than an eighth of a wavelength at the operating frequency in the dielectric material of said slot.

16. Apparatus as defined by claim 5, wherein the length and width of said slot are less than a quarter wavelength at the operating frequency in the dielectric material of said slot, and wherein the depth of said slot is less than an eighth of a wavelength at the operating frequency in the dielectric material of said slot.

17. Apparatus as defined by claim 1, further comprising conductive shielding means coupled to said metal base and surrounding a portion of the probe crossing said slot.

18. Apparatus as defined by claim 3, further comprising conductive shielding means coupled to said metal base and surrounding a portion of the probe crossing said slot.

19. Apparatus as defined by claim 17, wherein a central portion of the probe in said slot is unshielded, and said shielding means comprises spaced tubular conductors coupled to said metal base and surrounding the remainder of the probe in said slot.

20. Apparatus as defined by claim 1, further comprising means responsive to the outputs of said receiving antennas to obtain the relative amplitude and phase of the outputs of said receiving antennas, and means for determining the dielectric constant of said formations as a function of said amplitude and phase.

21. Apparatus as defined by claim 14, further comprising means responsive to the outputs of said receiving antennas to obtain the relative amplitude and phase of the outputs of said receiving antennas, and means for determining the dielectric constant of said formations as a function of said amplitude and phase.

22. Apparatus as defined by claim 1, wherein said means for energizing said transmitting antenna has a frequency greater than 100 MHz.

23. Apparatus as defined by claim 11, wherein said means for energizing said transmitting antenna has a frequency greater than 100 MHz.

24. Apparatus as defined by claim 14, wherein said means for energizing said transmitting antenna has a frequency greater than 100 MHz.

25. Apparatus as defined by claim 1 wherein said means for energizing said transmitting antenna has a frequency of 1100 MHz.

26. Apparatus for investigating formations surrounding a borehole, comprising:
a logging device moveable through the borehole;
a member mounted on the logging device and adapted for engagement with the borehole wall;

a transmitting slot antenna mounted in a wall-engaging face of said member;

a pair of spaced receiving slot antennas mounted in the wall-engaging face of said member in spaced relation to said transmitting antenna;

each of said antennas having a vertical magnetic dipole characteristic, with a magnetic dipole moment that is parallel to the axis of the borehole;

means for energizing said transmitting antenna to transmit electromagnetic energy into said formations at a frequency greater than 100 MHz; and means for generating an output signal at each of said receiving antennas representative of electromagnetic energy received from the formations.

27. Apparatus as defined by claim 26 wherein said means for energizing said transmitting antenna has a frequency of 1100 MHz.

28. Apparatus as defined by claim 26, further comprising means responsive to the outputs of said receiving antennas to obtain the relative amplitude and phase of the outputs of said receiving antennas, and means for determining the dielectric constant of said formations as a function of said amplitude and phase.

29. Apparatus as defined by claim 27, further comprising means responsive to the outputs of said receiving antennas to obtain the relative amplitude and phase of the outputs of said receiving antennas, and means for determining the dielectric constant of said formations as a function of said amplitude and phase.

* * * * *